(12) United States Patent
Jamil et al.

(10) Patent No.: US 7,366,845 B2
(45) Date of Patent: Apr. 29, 2008

(54) PUSHING OF CLEAN DATA TO ONE OR MORE PROCESSORS IN A SYSTEM HAVING A COHERENCY PROTOCOL

(75) Inventors: Sujat Jamil, Chandler, AZ (US); Hang T. Nguyen, Tempe, AZ (US); Samantha Edirisooriya, Tempe, AZ (US); David E. Miner, Chandler, AZ (US); R. Frank O'Bleness, Tempe, AZ (US); Steven J. Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 376 days.

(21) Appl. No.: 10/881,607

(22) Filed: Jun. 29, 2004

(65) Prior Publication Data

US 2005/0289303 A1 Dec. 29, 2005

(51) Int. Cl.
*G06F 12/00* (2006.01)
(52) U.S. Cl. ...................... 711/144; 711/141
(58) Field of Classification Search ............ None
See application file for complete search history.

(56) References Cited

U.S. PATENT DOCUMENTS

| | | | | |
|---|---|---|---|---|
| 5,119,485 A | * | 6/1992 | Ledbetter et al. | 711/146 |
| 5,652,915 A | * | 7/1997 | Jeter et al. | 710/52 |
| 5,903,911 A | * | 5/1999 | Gaskins | 711/141 |
| 6,842,822 B2 | * | 1/2005 | Snyder et al. | 711/118 |
| 2004/0002992 A1 | * | 1/2004 | Cypher et al. | 707/102 |
| 2005/0050281 A1 | * | 3/2005 | Snyder et al. | 711/144 |
| 2005/0273560 A1 | * | 12/2005 | Hulbert et al. | 711/133 |
| 2007/0039002 A1 | * | 2/2007 | McDonald | 718/102 |

OTHER PUBLICATIONS

Thacker, C.P. et al., "Firefly: A Multiprocessor Workstation," Proceedings of the International Conference on Architectural Support for Programming Languages and Operating Systems. (ASPLOS). Palo Alto, Oct. 5-8, 1987, Washington, IEEE Computer Society Press, pp. 167-172.

Eggers, S.J. et al., "Evaluating the Performance of Four Snooping Cache Coherency Protocols," Computer Architecture News, Association for Computing Machinery, New York, pp. 2-15, Jun. 17, 1989.

* cited by examiner

*Primary Examiner*—Donald Sparks
*Assistant Examiner*—Ngoc Dinh
(74) *Attorney, Agent, or Firm*—Blakely, Sokoloff, Taylor & Zafman LLP

(57) ABSTRACT

Techniques for pushing data to multiple processors in a clean state.

38 Claims, 7 Drawing Sheets

PUSHING OF CLEAN DATA TO ONE OR MORE PROCESSORS IN A SYSTEM HAVING A COHERENCY PROTOCOL

TECHNICAL FIELD

Embodiments of the invention relate to multi-processor computer systems. More particularly, embodiments of the invention relate to allowing bus agents to push clean data to caches corresponding to multiple processors in a coherent multi-processor computer system.

BACKGROUND

In current multi-processor systems, including Chip Multi-Processors, it is common for an input/output (I/O) device such as, for example, a network media access controller (MAC), a storage controller, a display controller, to generate temporary data to be processed by a processor core. Using traditional memory-based data transfer techniques, the temporary data is written to memory and subsequently read from memory by the processor core. Thus, two memory accesses are required for a single data transfer.

Because traditional memory-based data transfer techniques require multiple memory accesses for a single data transfer, these data transfers may be bottlenecks to system performance. The performance penalty can be further compounded by the fact that these memory accesses are typically off-chip, which results in further memory access latencies as well as additional power dissipation. Thus, current data transfer techniques result in system inefficiencies with respect to performance and power.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
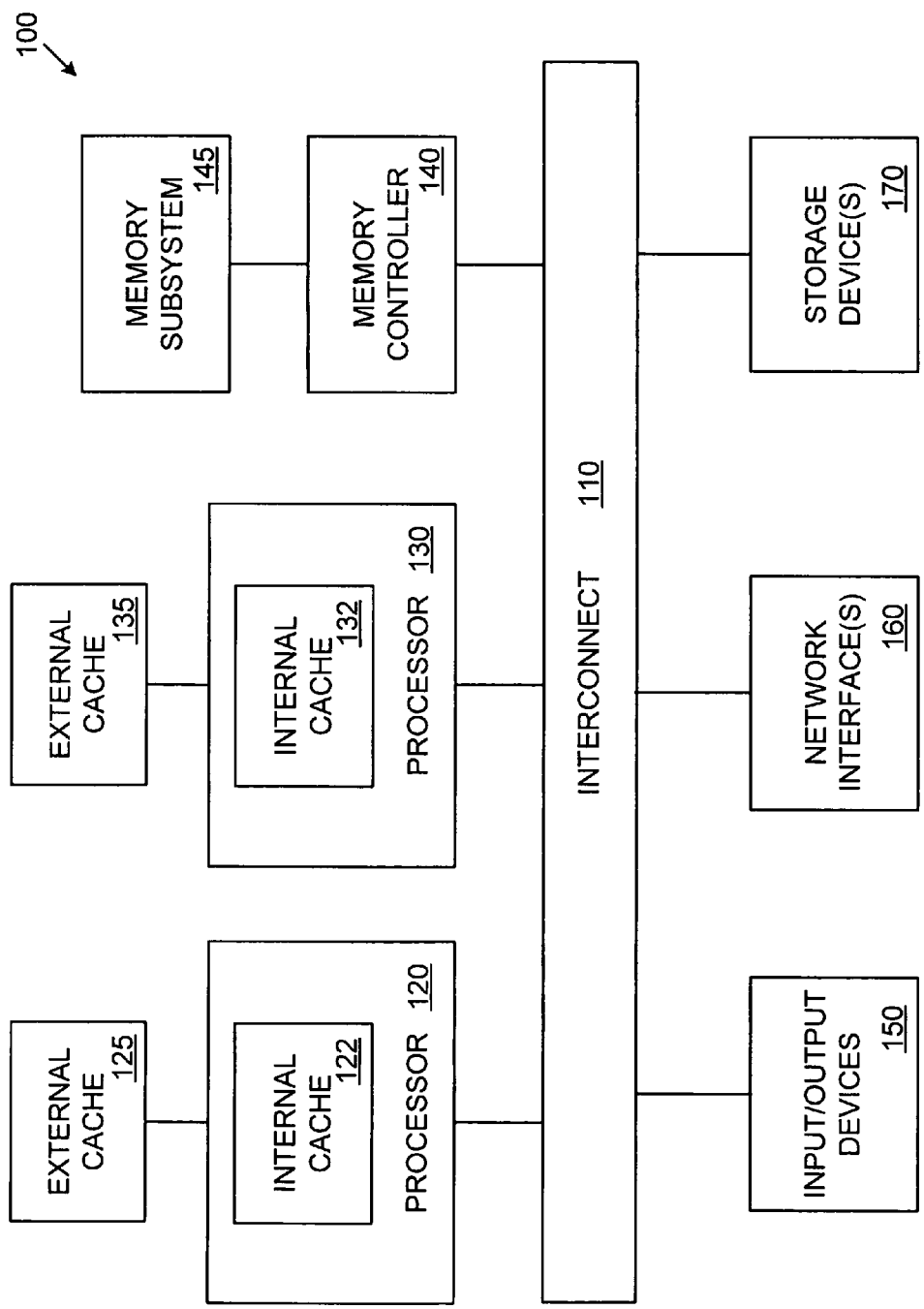
FIG. 1 is a block diagram of one embodiment of a computer system.

In the following description, numerous specific details are set forth. However, embodiments of the invention may be practiced without these specific details. In other instances, well-known circuits, structures and techniques have not been shown in detail in order not to obscure the understanding of this description.

Overview

In traditional cache designs having hardware support for cache coherency, a caching agent must obtain an exclusive ownership of a cache line before the agent can modify the cache line in the cache(s) controlled by the agent. Described in greater detail below, are architectures and techniques that allow external devices connected to a processor to push data directly to the processor cache(s) without the agent controlling the cache obtaining exclusive ownership of the line.

In one embodiment, an external (to the multiple processors having the cache memories receiving the data) agent preparing to push data to a multiprocessor system may initially notify all processors and the memory system (e.g., a memory controller) of the coming push operation. In a shared bus system, for example, notification messages may be accomplished by the processors snooping a shared address bus transaction. In a point-to-point system, notification messages may be sent to all processors as well as to the memory controller.

In the shared bus system there may be a single multicast data transfer that all processors and the memory controller. In point-to-point system, the data may be individually transmitted to all processors as well as to one or more memory controllers. If the request is accepted by all processors and the memory controller(s), the data to be written may be transmitted to all processors and to memory. Acceptance of the request may be determined by acknowledgement messages and/or absence of retries or stalls. It is also possible to have a shared bus for the address transactions and point-to-point connections for data transactions, and vice versa.

In one embodiment, in the point-to-point system, data may be individually transmitted to each processor and to memory. Each processor may write (or overwrite) data in a cache memory and update the coherency state (e.g., to Shared in a MSI/MESI/MOESI system or to Valid in a VI system). The corresponding memory location may also be updated.

In one embodiment, one or more of the following states may be used for coherency purposes. Modified refers to data that has been modified and is stored in a cache memory and the corresponding data in memory may not have been correspondingly modified and therefore may be invalid. Shared refers to data that may be stored by multiple cache memories and the corresponding copy in memory may be valid. Exclusive refers to data that may be stored in only one cache memory and the corresponding copy in memory may be valid. Owned refers to data that may be stored in only one cache memory and the corresponding copy in memory may be invalid. Invalid refers to data stored in a cache memory that may be invalid. Valid refers to data stored in a cache memory that may be valid.

FIG. 1 is a block diagram of one embodiment of a computer system. The computer system illustrated in FIG. 1 is intended to represent a range of computer systems. Alternative computer (or non-computer) systems can include more, fewer and/or different components.

In one embodiment, computer system 100 may include interconnect 110 to communicate information between components. Processor 120 may be coupled to interconnect 110 to process information. Further, processor 120 may include internal cache 122, which may represent any number of internal cache memories. In one embodiment, processor 120 may be coupled with external cache 125. Computer system 100 may further include processor 130 that may be coupled to interconnect 110 to process information. Processor 130 may include internal cache 132, which may represent any number of internal cache memories. In one embodiment, processor 130 may be coupled with external cache 135.

While computer system 100 is illustrated with two processors, computer system 100 may include any number of processors and/or co-processors. Computer system 100 may also include random access memory controller 140 coupled with interconnect 110. Memory controller 140 may act as an interface between interconnect 110 and memory subsystem 145, which may include one or more types of memory. For example, memory subsystem 145 may include random access memory (RAM) or other dynamic storage device to store information and instructions to be executed by processor 120 and/or processor 130. Memory subsystem 145 also can be used to store temporary variables or other intermediate information during execution of instructions by processor 120 and/or processor 130. Memory subsystem may further include read only memory (ROM) and/or other static storage device to store static information and instructions for processors 120 and/or processor 130.

Interconnect 110 may also be coupled with input/output (I/O) devices 150, which may include, for example, a display device, such as a cathode ray tube (CRT) controller or liquid crystal display (LCD) controller, to display information to a user, an alphanumeric input device, such as a keyboard or touch screen to communicate information and command selections to processor 120, and/or a cursor control device, such as a mouse, a trackball, or cursor direction keys to communicate direction information and command selections to processor 102 and to control cursor movement on a display device. Various I/O devices are known in the art.

Computer system 100 may further include network interface(s) 160 to provide access to one or more networks, such as a local area network, via wired and/or wireless interfaces. Storage device 170 may be coupled to interconnect 110 to store information and instructions.

Instructions are provided to memory subsystem 145 from storage device 170, such as magnetic disk, a read-only memory (ROM) integrated circuit, CD-ROM, DVD, via a remote connection (e.g., over a network via network interface 160) that is either wired or wireless, etc. In alternative embodiments, hard-wired circuitry can be used in place of or in combination with software instructions. Thus, execution of sequences of instructions is not limited to any specific combination of hardware circuitry and software instructions.

An electronically accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals); etc.

Figure 2:
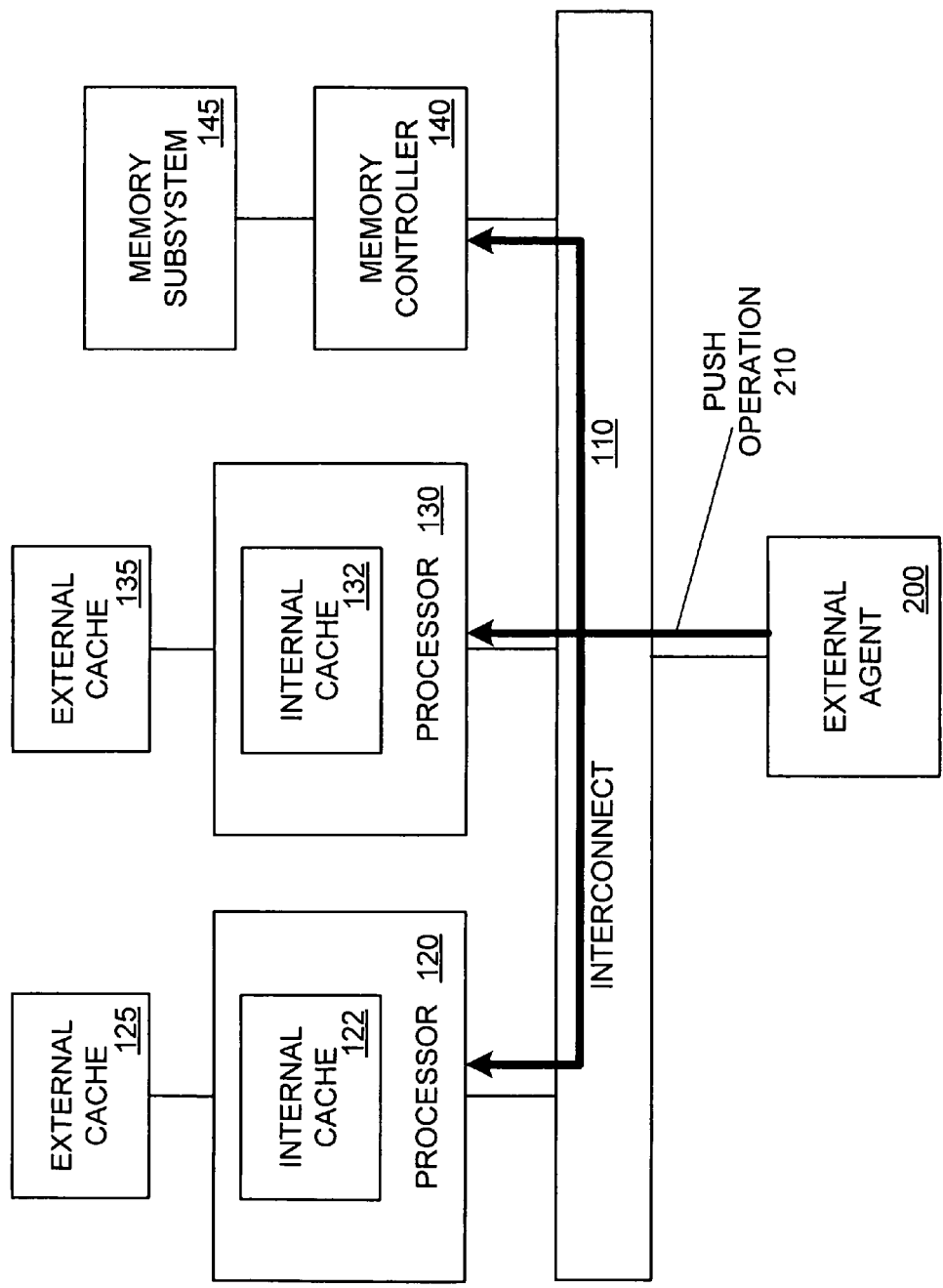
FIG. 2 is a conceptual illustration of a push operation from an external agent.

FIG. 2 is a conceptual illustration of a push operation from an external agent. The example of FIG. 2 corresponds to an external (to the processor) agent that may push data to one or more processors and memory. In one embodiment, the data that is pushed by the external agent may be stored by the processors and memory in a clean state (e.g., Shared or Valid). The external agent may be, for example, a direct memory access (DMA) device or a digital signal processor (DSP).

As will be described in greater detail below, the data that is pushed by external agent 200 may correspond to a full cache line or the data may correspond to a partial cache line. In one embodiment, during push operation 210, external agent 200 may push data to internal cache 122 of processor 120, internal cache 132 of processor 130 and memory controller 140. The data pushed by external agent 200 then exists coherently in a clean state in the cache of each processor as well as in memory. Thus, the data may be available for a cache hit on a subsequent load to the corresponding address by any of the processors. Because the pushed data is stored in a clean state, when any of the processors replace the data, for example, as the result of a conflict or capacity miss, the replacement may be performed without a write-back operation to memory.

Example Push Operations for Full Cache Lines

Figure 3:
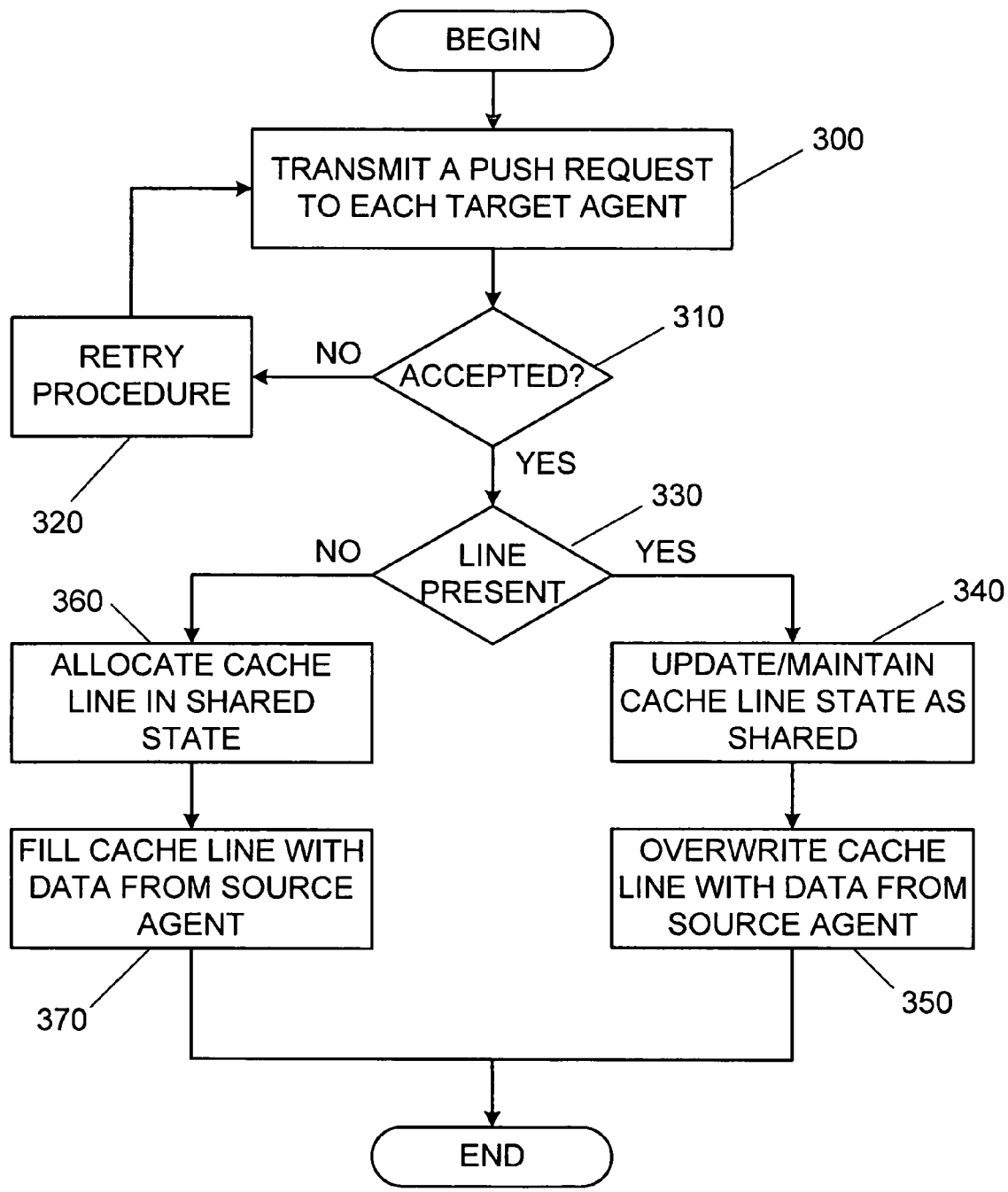
FIG. 3 is a flow diagram of one embodiment of a technique for pushing a full cache line to multiple target processors having cache memories in a system using a write-back coherency protocol.

FIG. 3 is a flow diagram of one embodiment of a technique for pushing a full cache line to multiple target processors having cache memories in a system using a write-back coherency protocol. In one embodiment, a push request may be transmitted to each target agent (e.g., processor) in a system, 300. Transmission of the push request may be accomplished, for example, by a broadcast message to all processors in a multiprocessor system using a shared bus as the interconnect, or by individual messages to each processor in case of a point-to-point interconnect.

If the request is not accepted by all target agents, 310, a retry procedure may be performed, 320. If all target agents accept the request, 310, each target agent determines whether the cache line being pushed is present in its cache memory, 330. In one embodiment, if the cache line is present, 330, the state of the cache line may be updated to or maintained as Shared, 340. The cache line may be overwritten with data being pushed by the external agent, 350.

If the cache line is not present in the cache memory of the target agent, 330, the agent may allocate a cache line in the Shared state, 360. The allocated cache line may be filled with the data pushed by the external agent, 370. When the data from the external agent has been stored in the cache of the target agent (350 or 370), the data is stored in the Shared state and is available for each of the target agents.

Figure 4:
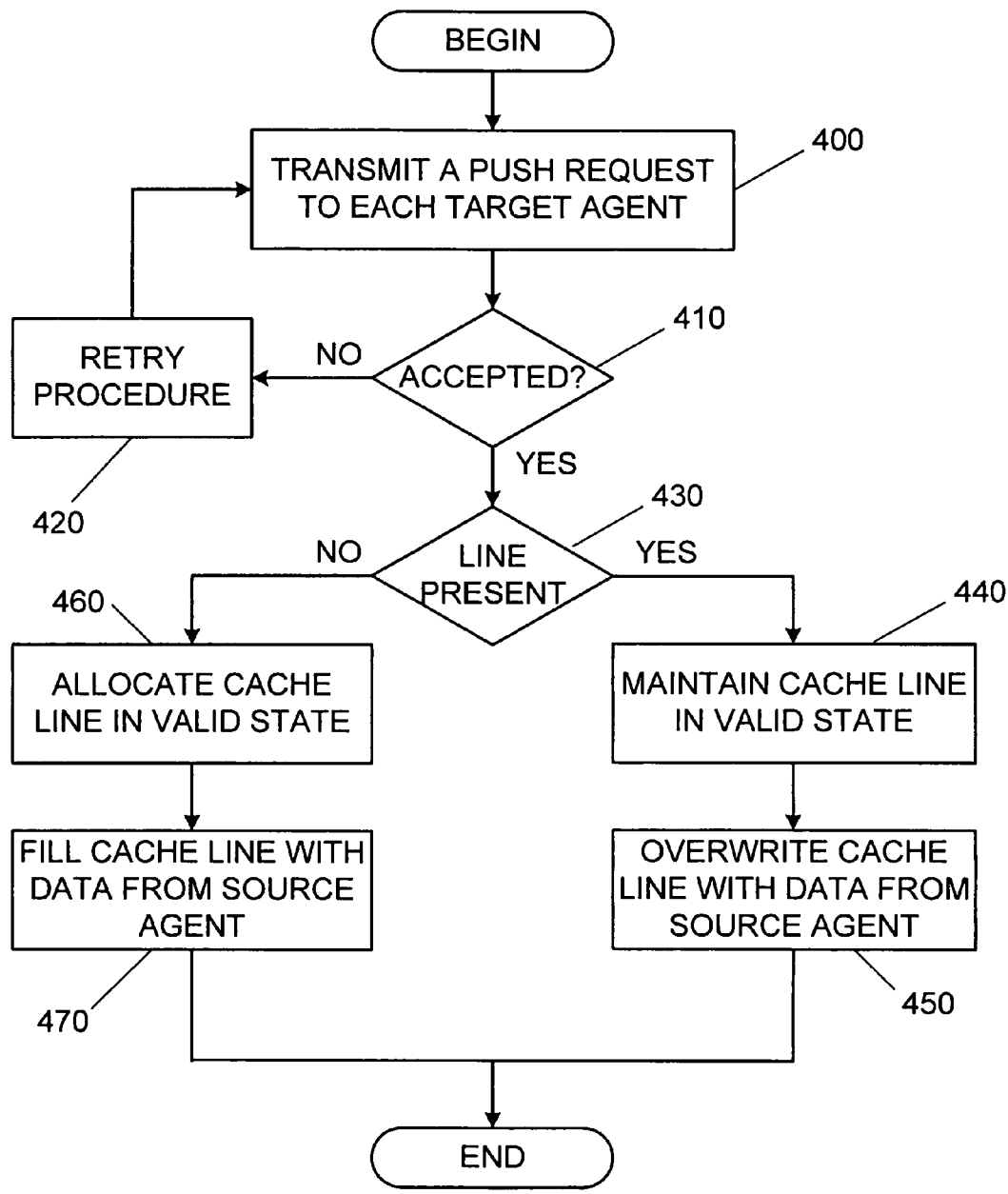
FIG. 4 is a flow diagram of one embodiment of a technique for pushing a full cache line to multiple target processors having cache memories in a system using a write-through coherency protocol.

FIG. 4 is a flow diagram of one embodiment of a technique for pushing a full cache line to multiple target processors having cache memories in a system using a write-through coherency protocol. In one embodiment, a push request may be transmitted to each target agent (e.g., processor) in a system, 400. Transmission of the push request may be accomplished, for example, by a broadcast message to all processors in a multiprocessor system using a shared bus as the interconnect, or by individual messages to each processor in case of a point-to-point interconnect.

If the request is not accepted by all target agents, 410, a retry procedure may be performed, 420. If all target agents accept the request, 410, each target agent determines whether the cache line being pushed is present in its cache memory, 430. In one embodiment, if the cache line is present, 430, the state of the cache line may be maintained in the Valid state, 440. The cache line may be overwritten with data being pushed by the external agent, 450.

If the cache line is not present in the cache memory of the target agent, 430, the agent may allocate a cache line in the Valid state, 460. The allocated cache line may be filled with the data pushed by the external agent, 470. When the data from the external agent has been stored in the cache of the target agent (450 or 470), the data is stored in the Valid state and is available for each of the target agents.

Figure 5:
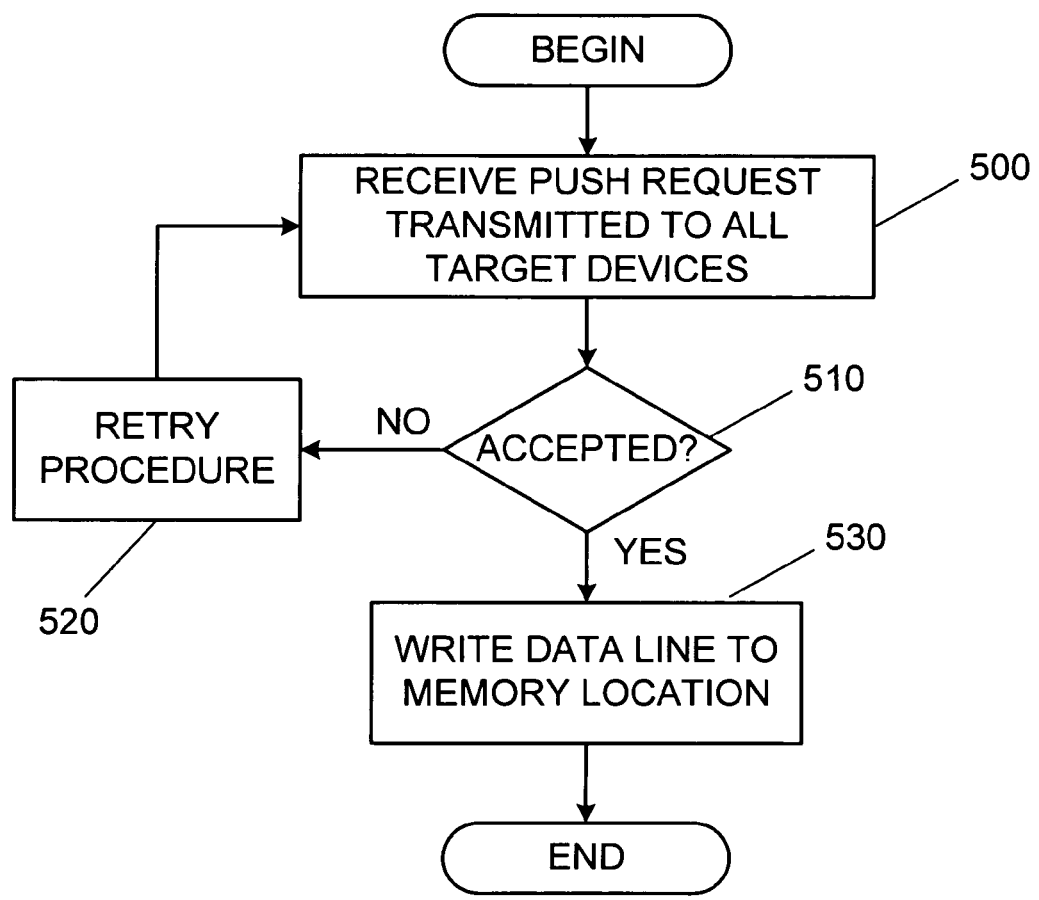
FIG. 5 is a flow diagram of one embodiment of a technique for pushing a full cache line to a memory controller in a system using a write-through or a write-back coherency protocol.

FIG. 5 is a flow diagram of one embodiment of a technique for pushing a full cache line to a memory controller in a system using a write-through or a write-back coherency protocol. In one embodiment, a memory controller may receive a push request that has been transmitted to all target devices in a system, 500.

In response to receiving the push request, the memory controller may determine whether all target devices in the system have accepted the push request, 510. If all target devices accept the push request, 510, the memory controller causes the pushed data line to be written to the appropriate memory location 530. If all target devices do not accept the push request, 510, a retry procedure may be implemented, 520.

Example Push Operations for Partial Cache Lines

Figure 6:
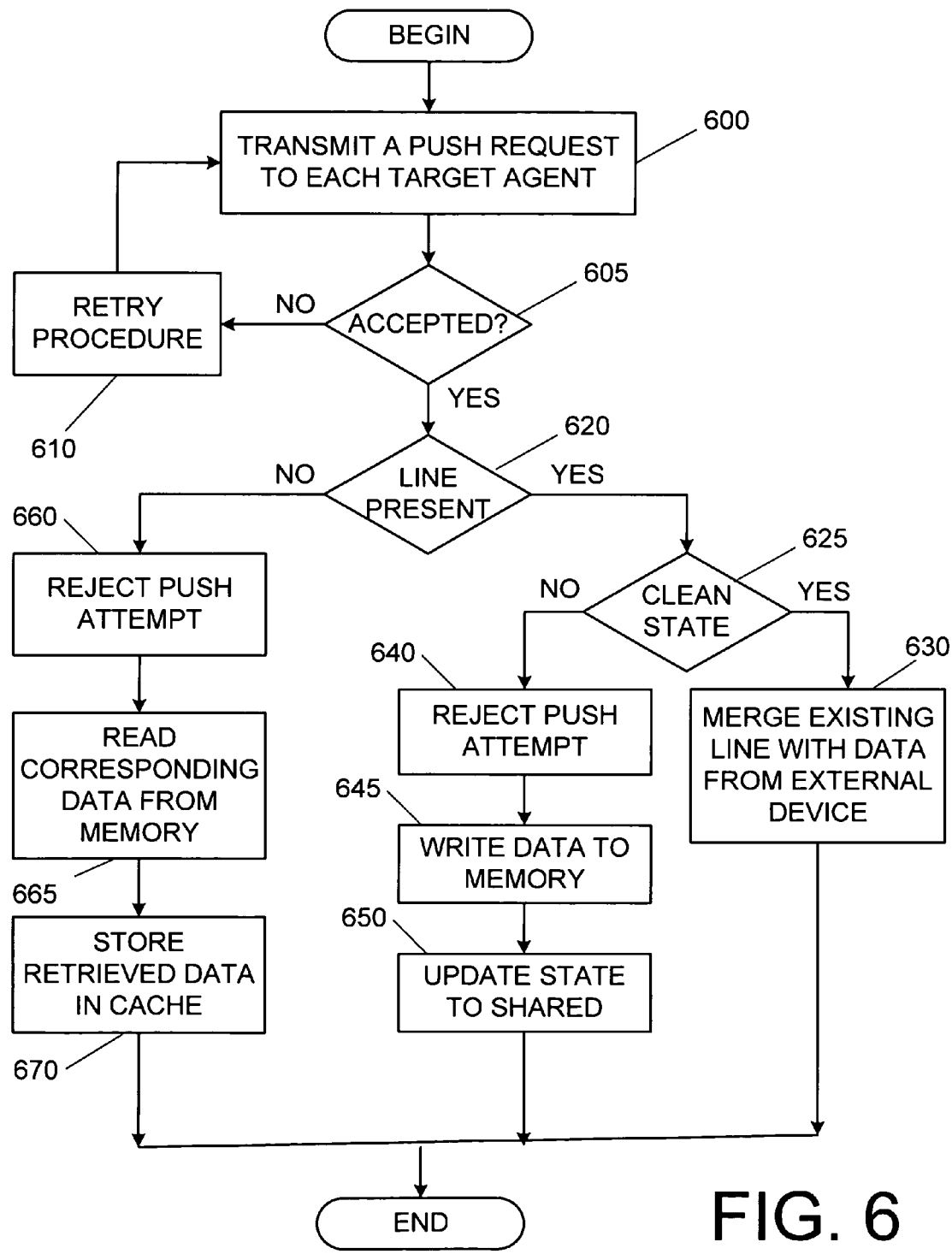
FIG. 6 is a flow diagram of one embodiment of a technique for pushing a partial cache line to multiple target processors having cache memories.

FIG. 6 is a flow diagram of one embodiment of a technique for pushing a partial cache line to multiple target processors having cache memories. In one embodiment, a push request may be transmitted to each target agent (e.g., processor) in a system, 600. Transmission of the push request may be accomplished, for example, by a broadcast message to all processors in a multiprocessor system using a shared bus as the interconnect, or by individual messages to each processor in case of a point-to-point interconnect.

If the request is not accepted by all target agents, 605, a retry procedure may be performed, 610. If all target agents accept the request, 605, each target agent determines whether the cache line being pushed is present in its cache memory, 620.

In one embodiment, if the data line is not present in the cache memory of the target agent, 620, the push attempt is rejected, 660. The agent may read the corresponding data from memory, 665. The retrieved data may be stored in the of the target agent, 670.

In one embodiment, if the data is present in the cache memory of the target agent, 620, the target agent may determine whether the cache line including the data is stored in a clean state, 625. If the line is stored in a clean state, the pushed, partial line of data may be merged with the existing data stored in the cache, 630.

If the line is not stored in a clean state, the target agent may reject the push attempt, 640. The target agent may then write the data in the dirty cache line to memory, 645. The state of the cache line may then be updated to Shared, 650.

Figure 7:
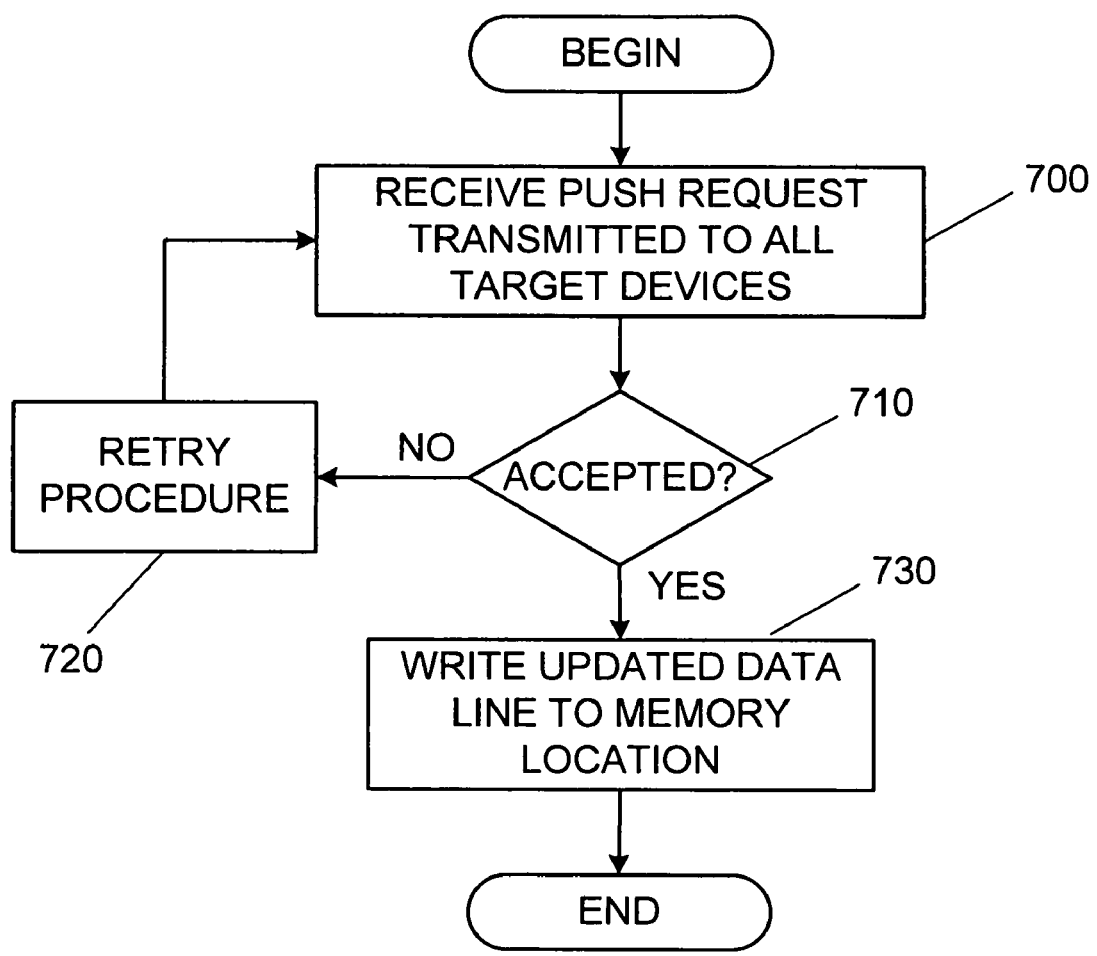
FIG. 7 is a flow diagram of one embodiment of a technique for pushing a full cache line to a memory controller in a system using a write-through or a write-back coherency protocol.

FIG. 7 is a flow diagram of one embodiment of a technique for pushing a partial cache line to a memory controller in a system using a write-through or a write-back coherency protocol. In one embodiment, a memory controller may receive a push request that has been transmitted to all target devices in a system, 700.

In response to receiving the push request, the memory controller may determine whether all target devices in the system have accepted the push request, 710. If all target devices accept the push request, 710, the memory controller causes the pushed, partial cache line to be written to the appropriate memory location 730. If all target devices do not accept the push request, 710, a retry procedure may be implemented, 720.

CONCLUSION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   transmitting to a plurality of processors and a memory controller, a request to push data from an agent external to the one or more processors;
   determining whether each of the processors and the memory controller has accepted the request; and
   if each of the processors and the memory controller have accepted the request, then for each processor having data corresponding to the data to be pushed from the agent, setting a state of the corresponding data to a clean state, if not already in a clean state, and overwriting the corresponding data with the data pushed from the agent.

2. The method of claim 1 wherein if each of the processors and the memory system have accepted the request, then for each processor not having data corresponding to the data to be pushed from the agent, storing the data pushed from the agent in a newly allocated cache line in a clean state.

3. The method of claim 1 wherein transmitting comprises transmitting the request to a subset of processors in a multi-processor system.

4. The method of claim 1 wherein the agent comprises a direct memory access (DMA) device.

5. The method of claim 1 wherein the agent comprises a digital signal processor (DSP).

6. The method of claim 1 wherein the clean state comprises a Shared state in a multi-processor system using a write-back cache coherency protocol.

7. The method of claim 1 wherein the clean state comprises a Valid state in a multi-processor system using a write-through cache coherency protocol.

8. The method of claim 1 wherein the data comprises a full cache line.

9. The method of claim 1 wherein the data comprises a partial cache line.

10. A system comprising:
    a plurality of processors;
    a memory controller; and
    a bus agent coupled with each of the plurality of processors and the memory controller to transmit to the plurality of processors and the memory controller a request to push data to at least one processor and to determine whether each of the plurality of processors and the memory controller receiving the request have accepted the request;
    wherein if each of the processors and the memory controller have accepted the request, then for each processor having data corresponding to the data to be pushed, the processor sets a state of the corresponding data to a clean state, if not already in a clean state, and overwrites the corresponding data with the pushed data.

11. The system of claim 10 wherein if each of the processors and the memory controller have accepted the request, then for each processor not having data corresponding to the data to be pushed from the agent, the processor rejects the push attempt.

12. The system of 10 wherein the plurality of processors comprises a subset of processors in a multi-processor system.

13. The system of claim 10 wherein the bus agent comprises a direct memory access (DMA) device.

14. The system of claim 10 wherein the bus agent comprises a digital signal processor (DSP).

15. The system of claim 10 wherein the clean state comprises a Shared state in a system using a write-back cache coherency protocol.

16. The system of claim 10 wherein the clean state comprises a Valid state in a system using a write-through cache coherency protocol.

17. The system of claim 10 wherein the data comprises a full cache line.

18. The system of claim 10 wherein the data comprises a partial cache line.

19. An agent in an electronic system comprising:
a bus interface;
control circuitry coupled with the bus interface to transmit a request to push data to a plurality of processors and a memory controller over the bus interface and to determine whether each of the processors and the memory controller have accepted the request, in response to each of the processors and the memory controller accepting the request, the control circuit causing data to be transmitted to each of the processors and to the memory controller with an indication to store the data in a clean state.

20. The agent of 19 wherein at least one of the processors, after accepting the request, rejects the transmitted data.

21. The agent of 19 wherein the plurality of processors comprises a subset of processors in a multi-processor system.

22. The agent of claim 19 wherein the clean state comprises a Shared state in a system using a write-back cache coherency protocol.

23. The agent of claim 19 wherein the clean state comprises a Valid state in a system using a write-through cache coherency protocol.

24. The agent of claim 19 wherein the data comprises a full cache line.

25. The agent of claim 19 wherein the data comprises a partial cache line.

26. An apparatus comprising:
means for transmitting to a plurality of processors and a memory controller, a request to push data from an agent external to the one or more processors;
means for determining whether each of the processors and the memory controller have accepted the request;
means for setting a state of the corresponding data to a clean state, if not already in a clean state, in each processor having data corresponding to the data to be pushed from the agent, and means for overwriting the corresponding data with the data pushed from the agent if each of the processors and the memory controller have accepted the request; and
means for storing the data pushed from the external agent in a clean state in each processor not having data corresponding to the data to be pushed from the agent if each of the processors and the memory controller have accepted the request.

27. The apparatus of claim 26 wherein the clean state comprises a Shared state in a system using a write-back cache coherency protocol.

28. The apparatus of claim 26 wherein the clean state comprises a Valid state in a system using a write-through cache coherency protocol.

29. The apparatus of claim 26 wherein the data comprises a full cache line.

30. The apparatus of claim 26 wherein the data comprises a partial cache line.

31. A system comprising:
a substantially omni-directional antenna;
at least one of a plurality of processors coupled with the antenna; and
a bus agent coupled with the plurality of processors and a memory controller to transmit a request to push data to at least a subset of the processors and the memory controller and to determine whether each of the processors receiving the request have accepted the request;
wherein if each of the processors and the memory controller have accepted the request, for each processor having data corresponding to the data to be pushed the processor, sets a state of the corresponding data to a clean state, if not already in a clean state, and overwrites the corresponding data with the pushed data and for each processor not having data corresponding to the data to be pushed, to store the pushed data in a clean state.

32. The system of claim 31 wherein for each processor not having a data line corresponding to the pushed data, the processor rejects the pushed data.

33. The system of claim 31 wherein the one or more of the plurality of processors comprises a subset of the plurality of processors.

34. The system of claim 31 wherein the bus agent comprises a direct memory access (DMA) device.

35. The system of claim 31 wherein the clean state comprises a Shared state in a system using a write-back cache coherency protocol.

36. The system of claim 31 wherein the clean state comprises a Valid state in a system using a write-through cache coherency protocol.

37. The system of claim 31 wherein the data comprises a full cache line.

38. The system of claim 31 wherein the data comprises a partial cache line.

* * * * *